United States Patent
Takahashi et al.

(10) Patent No.: US 7,085,463 B2
(45) Date of Patent: Aug. 1, 2006

(54) OPTICAL FIBER AND OPTICAL TRANSMISSION LINE

(75) Inventors: Fumio Takahashi, Tokyo (JP); Kazunori Mukasa, Tokyo (JP); Naomi Kumano, Tokyo (JP); Satoru Ise, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 76 days.

(21) Appl. No.: 10/737,850

(22) Filed: Dec. 18, 2003

(65) Prior Publication Data

US 2004/0170366 A1    Sep. 2, 2004

(30) Foreign Application Priority Data

Dec. 18, 2002 (JP) ............... 2002-367193
Oct. 17, 2003 (JP) ............... 2003-357996

(51) Int. Cl.
*G02B 6/36* (2006.01)

(52) U.S. Cl. .................. 385/127; 385/124

(58) Field of Classification Search ......... 385/123–128
See application file for complete search history.

(56) References Cited

U.S. PATENT DOCUMENTS

| | | | |
|---|---|---|---|
| 6,189,342 B1 * | 2/2001 | Berkey .................. 65/412 |
| 6,266,467 B1 | 7/2001 | Kato et al. | |
| 6,415,089 B1 * | 7/2002 | Kato et al. .................. 385/123 |
| 6,614,973 B1 * | 9/2003 | de Montmorillon et al. .................. 385/123 |
| 6,640,036 B1 * | 10/2003 | Mukasa et al. ............. 385/124 |
| 6,853,784 B1 * | 2/2005 | Shimizu et al. ............. 385/123 |
| 2003/0174988 A1 * | 9/2003 | Bickham et al. ............ 385/127 |
| 2004/0022509 A1 * | 2/2004 | Tandon ...................... 385/127 |

FOREIGN PATENT DOCUMENTS

JP    2002-162529    6/2002

* cited by examiner

*Primary Examiner*—John D. Lee
*Assistant Examiner*—Omar Rojas
(74) *Attorney, Agent, or Firm*—Oblon, Spivak, McClelland, Maier & Neustadt, P.C.

(57) ABSTRACT

An optical fiber has a zero dispersion wavelength in a wavelength range of 1350 to 1410 nanometers; a dispersion of 2 to 8 ps/nm/km at a wavelength of 1550 nanometers; a dispersion slope of a positive value and not more than 0.05 ps/nm$^2$/km at a wavelength of 1550 nanometers; a transmission loss of not more than 0.4 dB/km at a wavelength of 1380 nanometers; an increase of transmission loss of not more than 0.04 dB/km at a wavelength of 1380 nanometers after a hydrogen aging test; a transmission loss of not more than 0.25 dB/km at a wavelength of 1550 nanometers; and a bending loss of not more than 30 dB/m when the optical fiber is wound at a diameter of 20 millimeters at a wavelength of 1550 nanometers.

4 Claims, 5 Drawing Sheets

OPTICAL FIBER AND OPTICAL TRANSMISSION LINE

BACKGROUND OF THE INVENTION

1) Field of the Invention

The present invention relates to an optical fiber and an optical transmission line using the optical fiber. More particularly, the present invention relates to an optical fiber and an optical transmission line for use in wavelength division multiplexing (WDM) optical transmissions.

2) Description of the Related Art

Technologies for increasing transmission capacities of optical transmissions using optical fibers have been actively studied in the art.

In general, a transmission loss in the optical fiber is minimized at a wavelength of approximately 1550 nanometers. Therefore, in the optical transmissions using optical fibers, the use of this wavelength band is desired, and a dispersion-shifted fiber (DSF) having a zero dispersion wavelength at a wavelength of approximately 1550 nanometers has been developed. This optical fiber allows an optical transmission with a transmission capacity of several gigabits/sec (Gbps) to be achieved in a wavelength band of 1550 nanometers.

In recent years, as the technologies for increasing the transmission capacities, wavelength division multiplexing (WDM) optical transmissions have been extensively researched and developed. In addition, optical fibers suitable for WDM optical transmissions have been widely studied.

From the viewpoint of preventing the four-wave mixing that is one of non-linear phenomena, optical fibers for WDM optical transmissions are required to have no zero dispersion wavelength in a transmission wavelength band. This requirement results in development of a Non-Zero Dispersion-Shifted Fiber (hereinafter, "NZDSF"). The development of the NZDSF allows WDM transmissions in a wavelength range of 1530 to 1565 nanometers (C band) and a wavelength range of 1565 to 1625 nanometers (L band) to be achieved with remarkably increased transmission capacities.

In such WDM transmission systems, widening of the wavelength band of signal light has been attempted to further expand transmission capacities to a shorter wavelength range of 1460 to 1530 nanometers (S band).

Recently, to extend the transmission band of the wavelength division multiplexing transmission, it is studied to achieve a broadband optical amplifier using an Er-doped optical fiber amplifier (EDFA). In addition, applications of Raman amplifiers and new optical amplifiers using optical fibers doped with a rare earth element have been actively researched for the wavelength division multiplexing transmission, and even discussion for practical use has been started. Among those, a Raman-amplified optical transmission line using the Raman amplifier is expected to be actually available soon.

Raman amplification is described briefly below. In general, an incident light to a substance such as glass generates a light with a slightly longer wavelength than an original wavelength due to molecular oscillations and lattice oscillations of the substance. This generated light is called Raman scattered light. A more intensive incident pump light can generate more intensive Raman scattered lights with identical phases. The lights are called induced Raman scattered lights.

If an incident signal light has the same wavelength as that of the induced Raman scattered light, the induced Raman scattered light undergoes the same intensity variation as that of the signal light and thus amplifies the signal light. Due to induced Raman scattering that is caused when an intensive light (pump light) enters an optical fiber, a gain appears at a longer wavelength by approximately 100 nanometers than the pump light wavelength. This phenomenon is utilized in Raman amplification. That is, the pump light that has the gain in the wavelength range of the signal light is incident to the optical fiber for amplifying the signal light. Raman amplification is such a method of amplifying optical signals. A fiber-optic amplifier using Raman amplification utilizes an amplification due to a non-linear phenomenon that is caused in such the optical fiber.

As Raman amplification is caused in an optical transmission line (optical fiber), it is also referred to as a system that provides the optical transmission line with an amplifying light other than a signal light.

The conventional optical fibers include, for the purpose of achieving a broadband, an optical fiber having a zero dispersion wavelength shifted to around 1380 nanometers that is an absorption band for a hydroxyl group (OH group), and having an effective area, Aeff, of not less than 60 μm² at a wavelength of 1550 nanometers to prevent occurrence of four-wave mixing in dense wavelength division multiplexing (DWDM) (see U.S. Pat. No. 6,266,467, for example).

As known generally, however, an increased effective area Aeff lowers the efficiency for Raman amplification.

Aeff is defined in the following equation (1):

$$Aeff = \frac{\left(\int_0^\infty E^2 \cdot r \cdot dr\right)^2}{\int_0^\infty E^4 \cdot r \cdot dr} \quad (1)$$

where E denotes an electric field associated with a propagating light, and r denotes a distance in the radial direction from the core center in an optical fiber.

Raman amplification for the optical fiber disclosed in the patent requires a large optical power equal to or more than one Watt in total as a pump source.

This requirement not only simply lowers the efficiency uneconomically but also adversely affects an optical connector connected to the transmission line and a resin coated over the optical fiber possibly due to heat caused from application of a high power.

As shown, the optical fiber disclosed in the patent is not suitable for Raman-amplified transmission systems.

The patent describes that the broadband transmission in a wavelength range of 1200 to 1600 nanometers can be achieved by reducing the transmission loss in the OH group absorption peak band a minimum.

In general, the OH group absorption peak is known to increase with time when hydrogen enters. The patent, however, fails to give a description on the stable use of optical fibers for a long term.

The optical fiber, to the contrary, is known to have a reduced effective area Aeff for light propagating if the signal optical transmission band is shifted to a shorter wavelength. Accordingly, on transmission of a signal light in S band (1460 to 1530 nanometers) in the WDM system, an increase in the number of signals propagating in an optical fiber elevates the light intensity per unit area, resulting in a problem associated with signal distortion caused from the non-linear phenomenon.

Another attempt is made to expand the signal optical transmission band to a longer wavelength of 1625 to 1700 nanometers including U band (1625 to 1675 nanometers).

SUMMARY OF THE INVENTION

An object of the present invention is to provide an optical fiber and an optical transmission line using the optical fiber, which has a reduced transmission loss and a small dispersion on transmission of a broadband optical signal in wavelength division multiplexing transmissions and the like.

Another object of the present invention is to provide an optical fiber and an optical transmission line using the optical fiber, which is suitably applicable in a Raman-amplified optical transmission line.

The optical fiber of the present invention is configured as follows to overcome the above problems.

An optical fiber according to one aspect of the present invention has a zero dispersion wavelength in a wavelength range of 1350 to 1410 nanometers; a dispersion of 2 to 8 ps/nm/km at a wavelength of 1550 nanometers; a dispersion slope of a positive value and not more than 0.05 ps/nm2/km at a wavelength of 1550 nanometers; a transmission loss of not more than 0.4 dB/km at a wavelength of 1380 nanometers; an increase of transmission loss of not more than 0.04 dB/km at a wavelength of 1380 nanometers after a hydrogen aging test; a transmission loss of not more than 0.25 dB/km at a wavelength of 1550 nanometers; and a bending loss of not more than 30 dB/m when the optical fiber is wound at a diameter of 20 millimeters, at a wavelength of 1550 nanometers.

An optical fiber according to another aspect of the present invention includes a first core having a refractive index of n1 and located at the center of the optical fiber; a second core having a refractive index of n2 and surrounding the first core; a third core having a refractive index of n3 and surrounding the second core; and a cladding having a refractive index of n4 and surrounding the third core. In this case, the refractive indices satisfies a relation of n1>n3>n4>n2.

An optical fiber cable of the present invention includes at least one of the optical fiber.

An optical transmission line of the present invention includes the optical fiber cable.

An optical transmission line of the present invention includes the optical fiber.

The other objects, features and advantages of the present invention are specifically set forth in or will become apparent from the following detailed descriptions of the invention when read in conjunction with the accompanying drawings.

DETAILED DESCRIPTION

Exemplary embodiments of an optical fiber and an optical transmission line relating to the present invention will be explained in detail below with reference to the accompanying drawings.

Definitions on characteristics and methods of measurement in this specification are in accordance with ITU-T (International Telecommunications Union, Telecommunication Standardization Sector) G.650 unless specified.

As a first embodiment of the optical fiber according to the present invention, a dispersion-shifted fiber is exemplified, which is suitably usable as an optical fiber for wavelength division multiplexing transmissions.

As the first embodiment of the optical transmission line according to the present invention, a Raman-amplified optical transmission line is described. The Raman-amplified optical transmission line is known as a telecommunications system that can extend a signal transmittable distance and reduce noises in optical fiber telecommunications.

The known Raman-amplified optical transmission lines include a distributed Raman-amplified optical transmission line, and a discrete Raman-amplified optical transmission line. The distributed Raman-amplified optical transmission line is described in the first embodiment.

Figure 1:
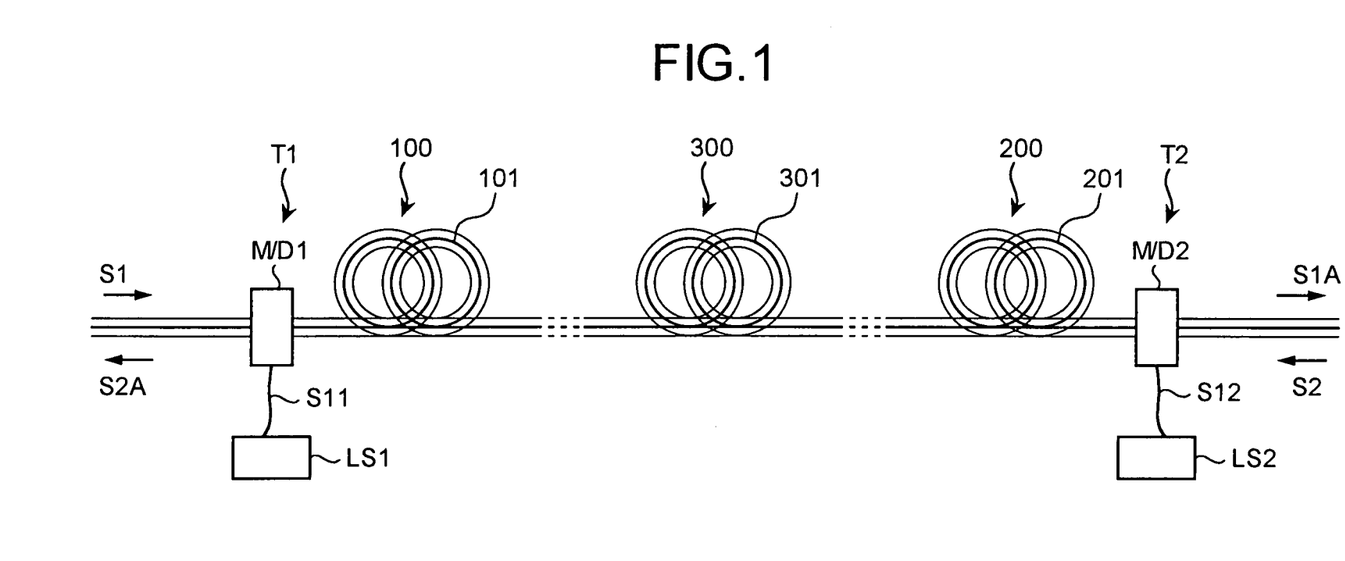
FIG. 1 is an arrangement diagram illustrating an optical transmission line using the distributed Raman amplifier according to a first embodiment of the present invention.

FIG. 1 is an arrangement diagram illustrating an example of the optical telecommunications system (transmission line) using the distributed Raman amplifier.

The transmission line using the distributed Raman amplifier shown in FIG. 1 includes a first transmission/reception terminal T1, a second transmission/reception terminal T2, and an optical fiber cable 300 located between the first T1 and the second T2 transmission/reception terminals.

The first transmission/reception terminal T1 includes a first pump light source LS1 for Raman amplification, a first multiplexing/demultiplexing unit M/D1, and a first optical fiber cable 100. The second transmission/reception terminal T2 has a configuration substantially similar to the first transmission/reception terminal T1 and includes a second pump light source LS2 for Raman amplification, a second multiplexing/demultiplexing unit M/D2, and a second optical fiber cable 200. The optical fiber cables 100, 200, and 300 contain at least one optical fiber 101, 201 and 301, respectively.

As the optical fiber cable for configuring the distributed Raman-amplified optical transmission line, only one of the optical fiber cables 100, 200, and 300 may be employed, and the optical fiber cables 100, 200, and 300 are not necessarily employed together. The optical fiber cable 300 exemplified in the first embodiment is located between the first and the second distributed Raman-amplified optical transmission lines because they have a relatively long distance between the first T1 and the second T2 transmission/reception terminals thereof. In the first embodiment, Raman amplification operations are achieved through the optical fibers 101, 201 and 301 in the optical fiber cables 100, 200, and 300, respectively.

In the transmission line, those input to the first multiplexing/demultiplexing unit M/D1 in the first transmission/ reception terminal T1 include a first transmission signal S1 to be transmitted to the second transmission/reception terminal T2, and an intensive pump light S11 from the first pump light source LS1. Both signals S1 and S11 are multiplexed at the first multiplexing/demultiplexing unit M/D1, then supplied to the optical fiber 101, and Raman-amplified in the optical fiber 101. The Raman-amplified optical signal is Raman-amplified again while propagating through the optical fibers 301 and 201. The Raman-amplified optical signal is received as a reception signal S1A through the second multiplexing/demultiplexing unit M/D2 in the second transmission/reception terminal T2.

A second transmission signal S2 to be transmitted from the second transmission/reception terminal T2 to the first transmission/reception terminal T1 is similarly Raman-amplified and received as a reception signal S2A through the first multiplexing/demultiplexing unit M/D1 in the first transmission/reception terminal T1.

In WDM optical communications system, a shorter wavelength pump light is employed to Raman-amplify a shorter wavelength signal light while a longer wavelength pump light to Raman-amplify a longer wavelength signal light.

The discrete Raman amplifier is such an amplifier that is configured as a dispersion compensating module composed of a coiled optical fiber and located in a relay station.

In the optical transmission line using the Raman amplifier, a light intensity distribution may be uniformed in the longitudinal direction of the optical fibers 101, 102 and 103. In an example, a signal may be transmitted from the first transmission/reception terminal T1 to the second transmission/reception terminal T2. In this example, preferably for Raman amplification at the first transmission/reception terminal T1, pump lights enter from both the first pump light source LS1 located at the front of the optical fiber 101 (the input side of the signal light) and the second pump light source LS2 located at the rear of the optical fiber 101 (the output side of the signal light). This is called bidirectional pumping. An example of bidirectional pumping is applied in the embodiment.

If the optical fibers 101, 102 and 103 are composed of quartz glass, Raman amplification has the largest gain peak present at a lower light frequency than the light frequency of the pump light by 13 terahertz. For example, in an optical telecommunications system for a 1.5-micrometer band, it is required to set a pump light at a wavelength of 1480 nanometers to allow a signal light having a wavelength of 1580 nanometers to take the largest Raman gain.

Figure 2A:
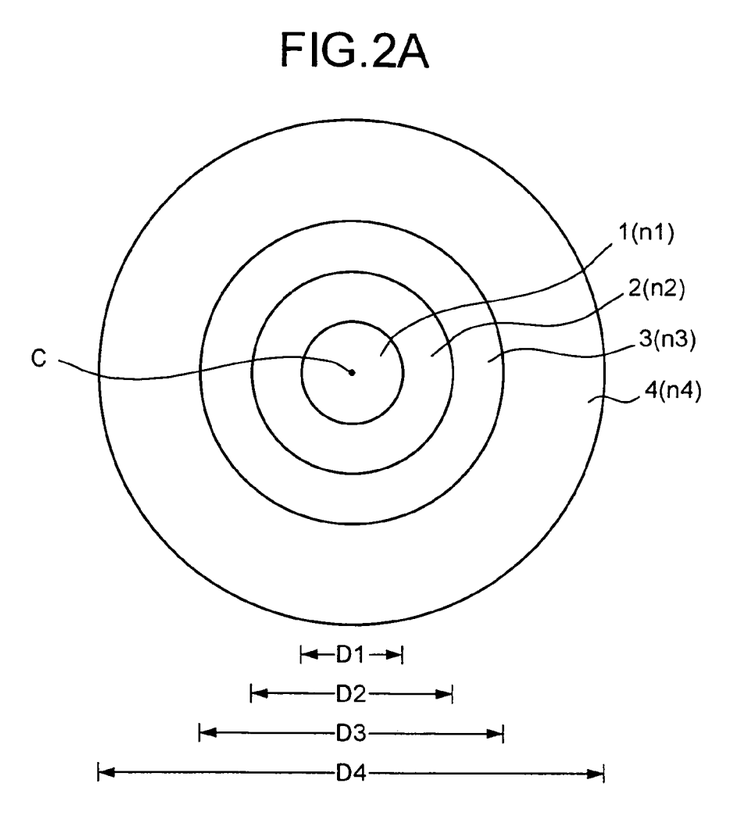
FIG. 2A is a sectional configuration diagram of an optical fiber according to the first embodiment.
Figure 2B:
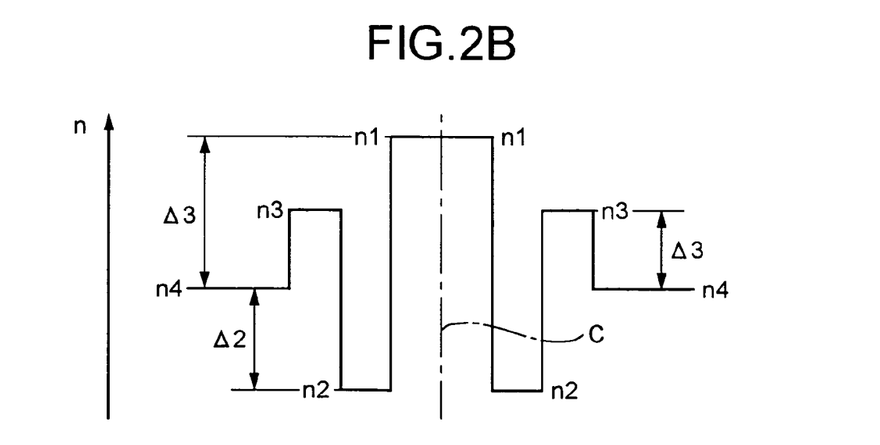
FIG. 2B illustrates a refractive index profile according to the first embodiment.

FIGS. 2A and 2B are diagrams illustrating a sectional configuration and a refractive index profile in the optical fiber 101, 102 and 103 for use in the distributed Raman-amplified optical transmission line show in FIG. 1.

The optical fiber shown in FIGS. 2A and 2B is a dispersion-shifted fiber. The dispersion-shifted fiber includes a first core 1 having a diameter of D1 and a refractive index of n1 and located at the center C of the optical fiber; a second core 2 having a diameter of D2 and a refractive index of n2 and surrounding the first core 1; a third core 3 having a diameter of D3 and a refractive index of n3 and surrounding the second core 2; and a cladding 4 having a diameter of D4 and a refractive index of n4 and surrounding the third core 3. The refractive indices have a dimensional relation of n1>n3>n4>n2.

In the dispersion-shifted fiber, the outside of the cladding 4 is coated with a resin though the resin coating is omitted to depict.

The dispersion-shifted fiber is composed of quartz glass, that is, silica-based glass. The first core 1 and the third core 3 having higher refractive indices than the refractive index n4 of the cladding 4 are doped with a dopant for increasing the refractive indices, such as germanium. The first core 1 is doped with a larger amount of germanium compared to the third core 3. The second core 2 having a lower refractive index than that of the cladding 4 is doped with a dopant that lowers the refractive index, such as fluorine.

A relative refractive index difference Δ1 of the first core 1 with the cladding 4; a relative refractive index difference Δ2 of the second core 2 with the cladding 4; and a relative refractive index difference Δ3 of the third core 3 with the cladding 4 are defined in the following equations (2):

$$\Delta 1 = \frac{n1^2 - n4^2}{2n1^2} \times 100 \simeq \frac{n1 - n4}{n1} \times 100 \quad (2)$$

$$\Delta 2 = \frac{n2^2 - n4^2}{2n2^2} \times 100 \simeq \frac{n2 - n4}{n2} \times 100$$

$$\Delta 3 = \frac{n3^2 - n4^2}{2n3^2} \times 100 \simeq \frac{n3 - n4}{n3} \times 100$$

The relative refractive index differences Δ1 to Δ3 are exemplified as Δ1=+0.54%, Δ2=−0.3%, and Δ3=+0.3%.

With reference to the outer diameter D2 of the second core 2, a ratio among the outer diameters D1:D2:D3 is exemplified as (D1/D2):(D2/D2):(D3/D2)=0.55:1.0:1.25.

Figure 3:
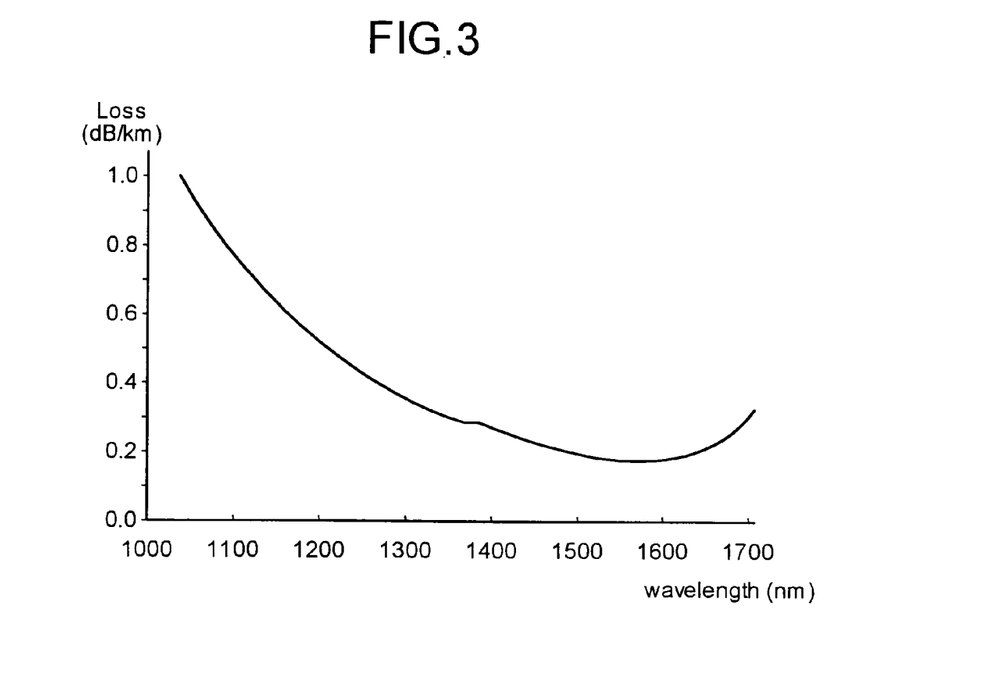
FIG. 3 illustrates a relation between wavelengths (lateral axis) and transmission losses (vertical axis) in the optical fiber according to the first embodiment.

FIG. 3 illustrates a relation between wavelengths (lateral axis) and transmission losses (vertical axis) in the dispersion-shifted fiber according to the first embodiment.

The dispersion-shifted fiber according to the first embodiment is found to have a minimized loss increase due to absorption of an OH group, and a transmission loss of 0.30 dB/km at a wavelength of 1380 nanometers.

Figure 4:
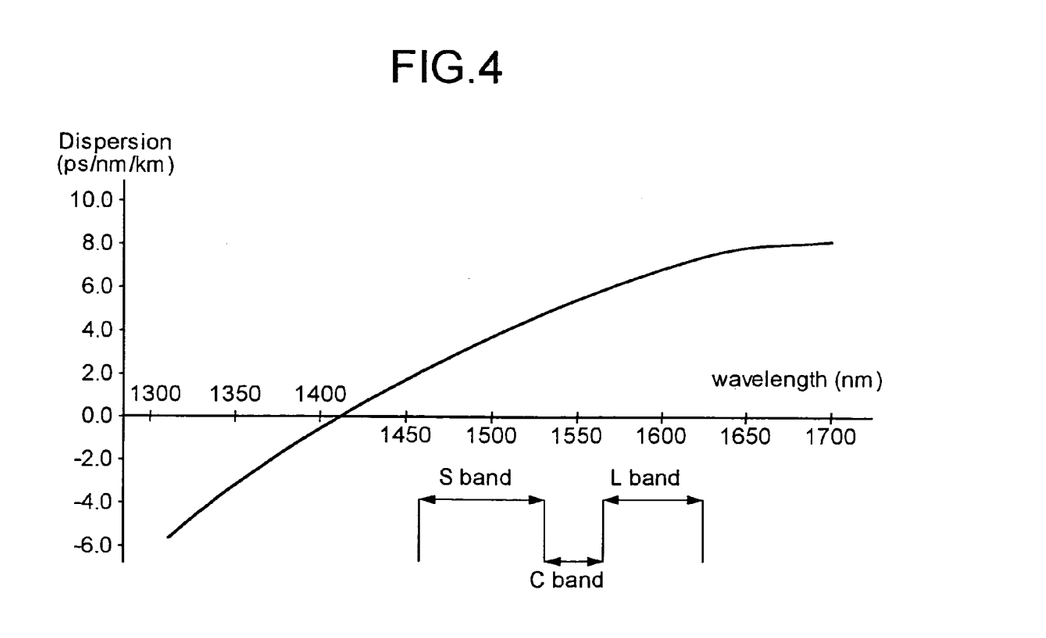
FIG. 4 illustrates a relation between wavelengths (lateral axis) and dispersion values (vertical axis) in the optical fiber according to the first embodiment.

FIG. 4 illustrates a relation between wavelengths (lateral axis) and dispersion values (vertical axis) in the optical fiber for wavelength division multiplexing transmissions according to the first embodiment.

The optical fiber for wavelength division multiplexing transmissions according to the first embodiment is found to have a zero dispersion wavelength at 1410 nanometers, and a dispersion value of 4.8 ps/nm·km at a wavelength of 1550 nanometers.

The dispersion-shifted fiber has characteristics including a transmission loss of 0.249 dB/km at a wavelength of 1550 nanometers, and an effective area Aeff of 45 μm² at a wavelength of 1550 nanometers. The dispersion-shifted fiber has a cable cut-off wavelength λcc of 1160 nanometers, and a dispersion slope of 0.029 ps/nm²·km at a wavelength of 1550 nanometers.

The dispersion-shifted fiber according to the embodiment is subjected to a hydrogen aging test that is in accordance with IEC 60793-2-50 (first edition 2002-01) Annex C, Section C3.1. After the test, a loss increase at a wavelength of 1380 nanometers was measured. The loss increase was 0.00 dB/km (λy=1380 nanometers).

As described above, the dispersion-shifted fiber according to the first embodiment has a zero dispersion wavelength in such a wavelength range of 1350 to 1410 nanometers that a transmission loss easily increases when an OH group is absorbed. Removal from the optical signal transmission band is required in the art for two bands: a band in a low dispersion range in the vicinity of the zero dispersion wavelength; and an OH group absorption band. To the contrary, it is sufficient in the present invention to remove a single wavelength band (the OH group absorption band). As a result, a transmittable wavelength range can be expanded to S band in addition to C and L bands.

The dispersion-shifted fiber according to the first embodiment has an effective area Aeff of not more than 50 µm², which is less than that of the conventional NZDSF and suitable for Raman amplification with improved Raman efficiency.

The dispersion-shifted fiber according to the first embodiment has a transmission loss of not more than 0.4 dB/km at a wavelength of 1380 nanometers. Therefore, it can minimize the attenuation of the pump light in the Raman-amplified optical transmission line.

The dispersion-shifted fiber according to the first embodiment has a transmission loss increase of not more than 0.04 dB/km at a wavelength of 1380 nanometers even after left in a hydrogen containing atmosphere at ordinary temperature under ordinary pressure. Therefore, it is possible to construct a Raman amplification system stable with less time variation of a transmission loss at a wavelength of 1380 nanometers for a long-term.

As described above, the dispersion-shifted fiber of the present invention is suitably applicable in the Raman-amplified optical transmission line.

The dispersion-shifted fiber according to the first embodiment of the present invention has a bending loss of not more than 30 dB/m when the optical fiber is wound at a diameter of 20 millimeters, and a cable cut-off wavelength λcc of 1350 nanometers or less.

An optical fiber produced on trial is subjected to measurement of characteristics in a wavelength range of 1530 to 1700 nanometers. As a result, it is found that a dispersion is 8.3 ps/nm/km at a wavelength of 1700 nanometers, and a dispersion slope in a wavelength range of 1530 to 1700 nanometers is the maximum of 0.023 ps/nm²/km. In addition, a transmission loss in a wavelength range of 1530 to 1700 nanometers has the maximum of 0.35 dB/km, and an effective area Aeff at a wavelength of 1700 nanometers is 52 µm².

The optical fiber according to the first embodiment is possible to expand a transmittable wavelength band from 1460 to 1700 nanometers as further including U band (1625 to 1675 nanometers) in addition to S, C and L bands. The optical fiber according to the first embodiment satisfies a condition that includes: 1) a dispersion of 2 to 12 ps/nm/km at wavelengths of 1530 to 1700 nanometers; 2) a dispersion slope of a positive value and not more than 0.05 ps/nm²/km in the wavelength range of 1530 to 1700 nanometers; and 3) an effective area Aeff of not less than 50 µ² m at a wavelength of 1700 nanometers.

The optical fiber that satisfies this condition is optimal for use in Raman-amplified WDM transmissions in a wavelength range of 1460 to 1700 nanometers including U band (1625 to 1675 nanometers) in addition to a wavelength range of S, C and L bands (1460 to 1625 nanometers). In this case, it is possible to suppress both waveform distortion of signal light due to non-linear phenomenon and waveform distortion of signal light due to cumulative dispersion. It is also possible to employ a multiple-wavelength signal light in a wider band over a wavelength range of 1460 to 1700 nanometers for high-capacity long-distance transmissions. This optical fiber has a transmission loss of not more than 0.4 dB/km in a wavelength range of 1530 to 1700 nanometers, permitting to transmit a signal light over a long distance.

Plural optical fibers produced on trial are employed to manufacture a loose-tube cable. A transmission loss of each optical fiber in a wavelength range of 1530 to 1700 nanometers was then measured. As a result, it is found that any optical fibers have a transmission loss of not more than 0.25 dB/km.

A second embodiment of the optical fiber of the present invention is described now.

Figure 5A:
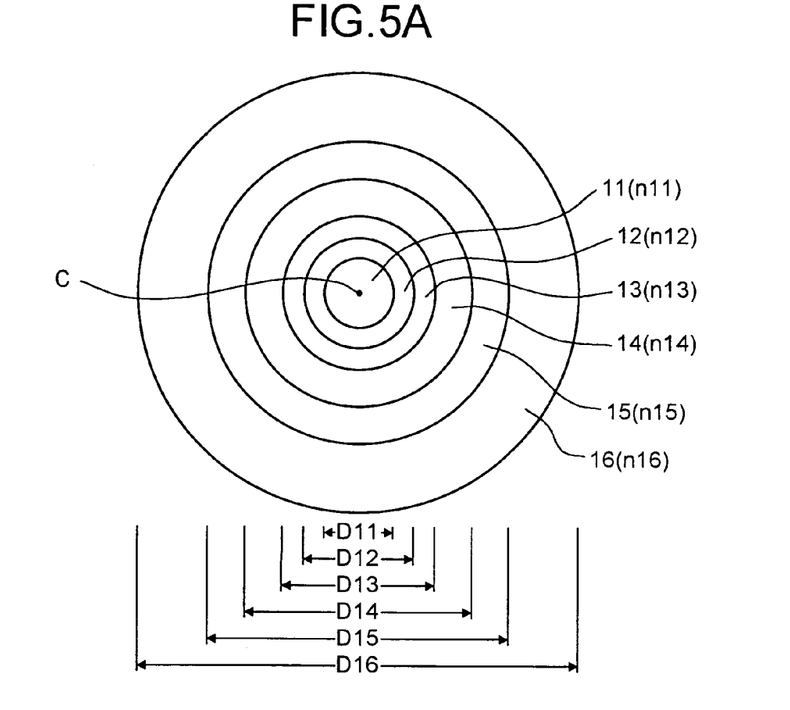
FIG. 5A is a sectional configuration diagram of an optical fiber according to a second embodiment of the present invention.
Figure 5B:
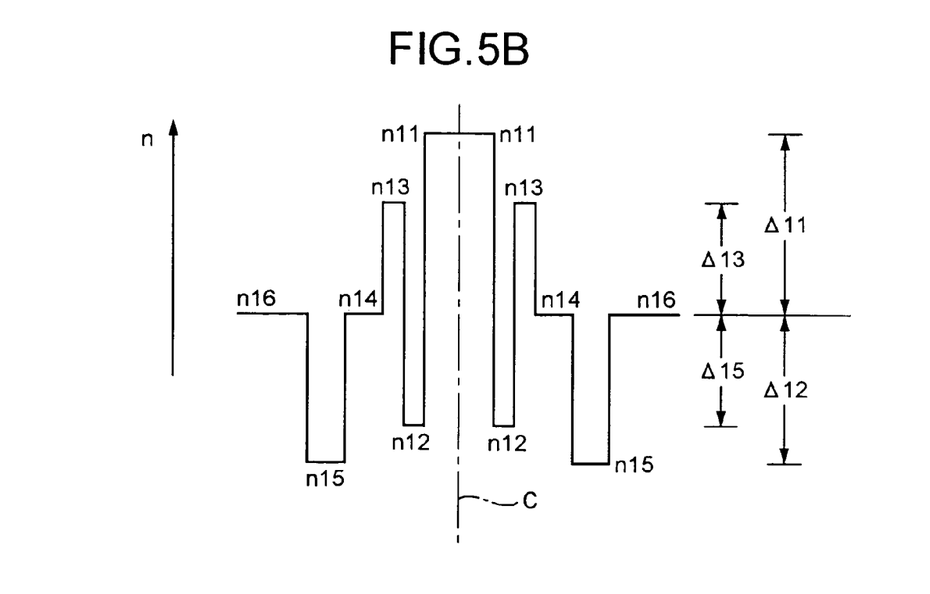
FIG. 5B illustrates a refractive index profile according to the second embodiment.

FIGS. 5A and 5B are diagrams illustrating a sectional configuration and a refractive index profile in a dispersion-shifted fiber that is the second embodiment of the optical fiber of the present invention.

The dispersion-shifted fiber according to the second embodiment includes a first core 11 having an outer diameter of D11 and a refractive index of n11 and located at the optical axis center C of the optical fiber; a second core 12 having an outer diameter of D12 and a refractive index of n12 and surrounding the first core 11; a third core 13 having an outer diameter of D13 and a refractive index of n13 and surrounding the second core 12; a first cladding 14 having an outer diameter of D14 and a refractive index of n14 and surrounding the third core 13; an annular region 15 having an outer diameter of D15 and a refractive index of n15 and surrounding the first cladding 14; and a second cladding 16 having an outer diameter of D16 and a refractive index of n16 and surrounding the annular region 15.

This dispersion-shifted fiber is provided with a resin coating outside of the second cladding 16 though the resin coating is omitted to depict. The refractive indices have a dimensional relation of n11>n13>n16>n12>n15. The refractive index n14 has a value almost equal to the refractive index n16.

The dispersion-shifted fiber according to the second embodiment is composed of quartz glass, that is, silica-based glass. The first core 11 and the third core 13 having higher refractive indices than the refractive index n16 of the second cladding 16 are doped with a dopant for increasing the refractive indices, such as germanium. The first core 11 is doped with a larger amount of germanium compared to the third core 13. The second core 12 and the annular region 15 having lower refractive indices than that of the second cladding 16 are doped with a dopant that lowers the refractive indices, such as fluorine. The annular region 15 is doped with a larger amount of fluorine compared to the second core 12.

A relative refractive index difference Δ11 of the first core 11 with the second cladding 16; a relative refractive index difference Δ12 of the second core 12 with the second cladding 16; a relative refractive index difference Δ13 of the third core 13 with the second cladding 16; and a relative refractive index difference Δ15 of the annular region 15 with the second cladding 16 are similarly defined in the above described equations (2).

For example, the relative refractive index difference Δ11 is equal to 0.54%, the specific refractive index difference Δ12 is equal to −0.3%, the specific refractive index difference Δ13 is equal to 0.25%, the specific refractive index difference Δ14 is about 1.0%, and the specific refractive index difference Δ15 is equal to −0.4%.

With reference to the outer diameter D12 of the second core 12, a ratio among the outer diameters is exemplified as (D11/D12):(D12/D12):(D13/D12):(D14/D12):(D15/D12)= 0.55:1.0:1.35:2.2:2.5.

The dispersion shifted fiber according to the second embodiment is found to have a zero dispersion wavelength of 1380 nanometers; a transmission loss of 0.35 dB/km at a wavelength of 1380 nanometers; a transmission loss of 0.218 dB/km at a wavelength of 1550 nanometers; a dispersion of 4.9 ps/nm·km at a wavelength of 1550 nanometers; an effective area Aeff of 45 µm²; and a cable cut-off wavelength λcc of 1270 nanometers; and a dispersion slope of 0.020 ps/nm2·km at a wavelength of 1550 nanometers.

The dispersion-shifted fiber according to the second embodiment is subjected to a hydrogen aging test that is in accordance with IEC 60793-2-50 (first edition 2002-01) Annex C, Section C3.1. After the test, a loss increase at a wavelength of 1380 nanometers was measured. The loss increase was 0.00 dB/km (λy=1380 nanometers). The dispersion-shifted fiber according to the second embodiment has a bending loss of not more than 30 dB/m when the optical fiber is wound at a diameter of 20 millimeters.

As described above, the dispersion-shifted fiber according to the second embodiment is suitably applicable in the distributed Raman-amplified optical transmission line because it has a transmittable wavelength range expanded to S band in addition to C and L bands.

The optical fiber of the present invention is not limited in the examples having the configurations and refractive index profiles shown with reference to FIGS. 2A, 2B, 5A and 5B. It is not limited in the exemplary optical fiber, if it has: 1) a zero dispersion wavelength in a wavelength range of 1350 to 1410 nanometers; 2) a dispersion equal to 2 to 8 ps/nm/km at a wavelength of 1550 nanometers; 3) a dispersion slope of a positive value and not more than 0.05 ps/nm$^2$/km at a wavelength of 1550 nanometers; 4) a transmission loss of not more than 0.4 dB/km at a wavelength of 1380 nanometers; 5) an increase of transmission loss of not more than 0.04 dB/km at a wavelength of 1380 nanometers after a hydrogen aging test; 6) a transmission loss of not more than 0.25 dB/km at a wavelength of 1550 nanometers; and 7) a bending loss of not more than 30 dB/m when the optical fiber is wound at a diameter of 20 millimeters at a wavelength of 1550 nanometers.

A third embodiment of the optical fiber of the present invention is described next. As shown, the optical fiber according to the second embodiment has a transmittable wavelength range including S band in addition to C and L bands. In contrast, the optical fiber according to the third embodiment is possible to expand a transmittable wavelength range to 1530 to 1700 nanometers including U band (1625 to 1675 nanometers) in addition to C and L bands. The optical fiber according to the third embodiment satisfies a condition that includes: 1) a dispersion of 2 to 12 ps/nm/km in a wavelength range of 1530 to 1700 nanometers; 2) a dispersion slope of a positive value and not more than 0.05 ps/nm$^2$/km at wavelengths of 1530 to 1700 nanometers; and 3) an effective area Aeff of not less than 50 μm$^2$ at a wavelength of 1700 nanometers.

The optical fiber that satisfies this condition is optimal for use in Raman-amplified WDM transmissions in a wavelength range of 1530 to 1700 nanometers including U band (1625 to 1675 nanometers) in addition to a wavelength range of C and L bands (1530 to 1625 nanometers). In this case, it is possible to suppress both waveform distortion of signal light due to non-liner phenomenon and waveform distortion of signal light due to cumulative dispersion. It is also possible to employ a multiplexed-wavelength signal light in a wider band over wavelengths of 1530 to 1700 nanometers for high-capacity long-distance transmissions. This optical fiber has a transmission loss of not more than 0.4 dB/km in a wavelength range of 1530 to 1700 nanometers, permitting to transmit a signal light over a long distance.

Figure 6:
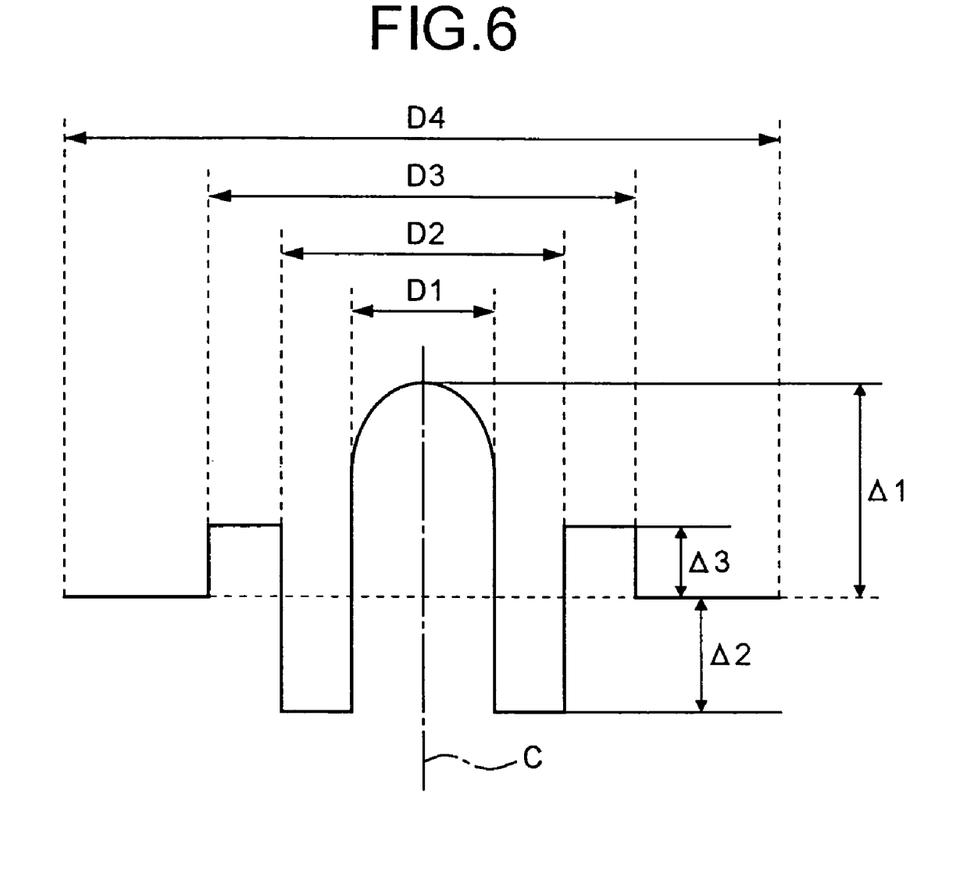
FIG. 6 illustrates a refractive index profile of an optical fiber according to a third embodiment of the present invention.

The optical fiber that satisfies such the condition can be manufactured based on quartz glass by drawing a preform with a dopant (germanium) doped in the central core region and the third core region corresponding to the first core 1 and the third core 3 respectively.

An optical fiber, which is produced on trial and satisfies such the condition, is found to have an outer diameter D1 of the first core 1 equal to 5.4 micrometers; an outer diameter D2 of the second core 2 equal to 9.8 micrometers; an outer diameter D3 of the third core 3 equal to 20 micrometers; and an outer diameter D4 of the cladding 4 equal to 125 micrometers (see FIG. 6). The first core 1 has a relative refractive index difference Δ1 of 0.82%, the second core 2 has a relative refractive index difference Δ2 of −0.5%, and the third core 3 has a relative refractive index difference Δ3 of 0.2%. The drawn optical fiber is then exposed to a deuterium containing atmosphere for approximately three hours to improve hydrogen resistance.

The optical fiber produced on trial is subjected to measurement of characteristics. As a result, it is found that a zero dispersion wavelength is present at 1475 nanometers; a dispersion is equal to 9.8 ps/nm/km at a wavelength of 1700 nanometers; a maximum dispersion slope in a wavelength range of 1530 to 1700 nanometers is 0.023 ps/nm$^2$/km; and a maximum transmission loss in a wavelength range of 1530 to 1700 nanometers is 0.35 dB/km. In addition, an effective area Aeff at a wavelength of 1700 nanometers is equal to 52 μm$^2$, and a cable cut-off wavelength λcc in a length of 22 meters is 1420 nanometers.

Plural optical fibers produced on trial are employed to manufacture a loose-tube cable. A transmission loss of each optical fiber in a wavelength range of 1530 to 1700 nanometers was then measured. As a result, it is found that any optical fiber has a transmission loss of 0.25 dB/km or less.

The dispersion-shifted fiber of the present invention has one zero dispersion wavelength in such a wavelength range of 1350 to 1410 nanometers that a transmission loss easily increases when an OH group is absorbed. Removal from the optical signal transmission band is required in the art for two bands: a band in a low dispersion range in the vicinity of the zero dispersion wavelength; and an OH group absorption band. To the contrary, it is sufficient in the present invention to remove only a single wavelength band (the OH group absorption band), resulting in an expanded transmittable wavelength range.

The optical fiber of the present invention has a transmission loss of not more than 0.4 dB/km at a wavelength of 1380 nanometers, and an increase of transmission loss of not more than 0.04 dB/km at a wavelength of 1380 nanometers after left in a hydrogen containing atmosphere at ordinary temperature under ordinary pressure. Therefore, the optical fiber of the present invention is possible to minimize the attenuation of the pump light and construct a Raman-amplified optical transmission line that has less time variation of a transmission loss for a long term and is operable in stable for a long term.

The present invention has been described with characteristic embodiments in order to disclose the invention in a complete and clear manner. However, the appended claims should not be limited by the above embodiments, and should embody full range of modifications and replaceable configurations that can be conceived by persons skilled in the art, within the scope of fundamental features described in the present specification.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical fiber, having
a zero dispersion wavelength in a wavelength range of 1350 to 1410 nanometers;
a dispersion of 2 to 8 ps/nm/km at a wavelength of 1550 nanometers;
a dispersion slope of a positive value and not more than 0.05 ps/nm$^2$/km at a wavelength of 1550 nanometers;
a transmission loss of not more than 0.4 dB/km at a wavelength of 1380 nanometers;
an increase of transmission loss of not more than 0.04 dB/km at a wavelength of 1380 nanometers after a hydrogen aging test;
a transmission loss of not more than 0.25 dB/km at a wavelength of 1550 nanometers; and
a bending loss of not more than 30 dB/m when the optical fiber is wound at a diameter of 20 millimeters at a wavelength of 1550 nanometers
wherein a first core having a refractive index of n1, and located at the center of the optical fiber;
a second core having a refractive index of n2, and surrounding the first core;
a third core having a refractive index of n3, and surrounding the second core; and
a cladding having a refractive index of n4, and surrounding the third core, where n1>n3>n4>n2 and wherein the cladding includes an annular region having a refractive index of n5, where n4>n5.

2. An optical fiber cable comprising:
an optical fiber that has a zero dispersion wavelength in a wavelength range of 1350 to 1410 nanometers;
a dispersion of 2 to 8 ps/nm/km at a wavelength of 1550 nanometers;
a dispersion slope of a positive value and not more than 0.05 ps/nm$^2$/km at a wavelength of 1550 nanometers;
a transmission loss of not more than 0.4 dB/km at a wavelength of 1380 nanometers;
an increase of transmission loss of not more than 0.04 dB/km at a wavelength of 1380 nanometers after a hydrogen aging test;
a transmission loss of not more than 0.25 dB/km at a wavelength of 1550 nanometers; and
a bending loss of not more than 30 dB/m when the optical fiber is wound at a diameter of 20 millimeters at a wavelength of 1550 nanometers, wherein
a first core having a refractive index of n1, and located at the center of the optical fiber;
a second core having a refractive index of n2, and surrounding the first core;
a third core having a refractive index of n3, and surrounding the second core; and
a cladding having a refractive index of n4, and surrounding the third core, where n1>n3>n4>n2, and wherein the cladding includes an annular region having a refractive index of n5, where n4>n5.

3. An optical transmission line for a Raman amplification system, comprising:
an optical fiber that has a zero dispersion wavelength in a wavelength range of 1350 to 1410 nanometers;
a dispersion of 2 to 8 ps/nm/km at a wavelength of 1550 nanometers;
a dispersion slope of a positive value and not more than 0.05 ps/nm$^2$/km at a wavelength of 1550 nanometers;
a transmission loss of not more than 0.4 dB/km at a wavelength of 1380 nanometers;
an increase of transmission loss of not more than 0.04 dB/km at a wavelength of 1380 nanometers after a hydrogen aging test;
a transmission loss of not more than 0.25 dB/km at a wavelength of 1550 nanometers; and
a bending loss of not more than 30 dB/m when the optical fiber is wound at a diameter of 20 millimeters at a wavelength of 1550 nanometers wherein a first core having a refractive index of n1, and located at the center of the optical fiber;
a second core having a refractive index of n2, and surrounding the first core;
a third core having a refractive index of n3, and surrounding the second core; and
a cladding having a refractive index of n4, and surrounding the third core, where n1>n3>n4>n2, and wherein the cladding includes an annular region having a refractive index of n5, where n4>n5.

4. The optical transmission line of claim 3, further comprising an optical fiber cable that includes the optical fiber.

* * * * *